United States Patent [19]

Iketani

[11] Patent Number: 5,323,100

[45] Date of Patent: Jun. 21, 1994

[54] POWER SUPPLY DEVICE

[75] Inventor: Kohei Iketani, Tokyo, Japan

[73] Assignee: Asahi Kogaku Kogyo Kabushiki Kaisha, Tokyo, Japan

[21] Appl. No.: 20,778

[22] Filed: Feb. 22, 1993

[30] Foreign Application Priority Data

Feb. 20, 1992 [JP] Japan .................................. 4-070138

[51] Int. Cl.$^5$ .............................................. H02J 7/00
[52] U.S. Cl. ............................................ 320/13; 320/2
[58] Field of Search ...................................... 320/13, 2

[56] References Cited

U.S. PATENT DOCUMENTS

| 3,921,197 | 11/1975 | Horvath | 320/39 X |
| 4,025,935 | 5/1977 | Wagensonner et al. | 320/13 X |
| 4,451,743 | 5/1984 | Suzuki et al. | 307/110 |
| 4,553,196 | 11/1985 | Tokuyama et al. | 363/21 |
| 4,698,578 | 10/1987 | Mullersman et al. | 320/13 |
| 4,920,307 | 4/1990 | Iketani | 320/28 |
| 5,204,608 | 4/1993 | Koenck | 320/13 X |

Primary Examiner—R. J. Hickey
Attorney, Agent, or Firm—Sandler, Greenblum & Bernstein

[57] ABSTRACT

A power supply device including a switching regulator, to supply electric power from a battery to a device to be operated, such as a motor. A first switch is provided between the battery and the switching regulator. A second switch is provided between the switching regulator and the device to be operated. A voltage sensing circuit is provided for sensing an output voltage of the battery. When the battery voltage is higher than a predetermined value, the first and second switches are switched so that the battery voltage is applied on the motor through the switching regulator. When the battery voltage is lower than a predetermined value, the first and second switches are switched, so that the battery voltage is applied on the motor without the switching regulator.

14 Claims, 5 Drawing Sheets

POWER SUPPLY DEVICE

BACKGROUND OF THE INVENTION

1. Field of the Invention

The present invention relates to a power supply device which is mounted in a portable device such as a camera, a notebook-type personal computer, for example, to supply electric power to a motor, a microcomputer and the like provided in the portable device.

2. Description of the Related Art

Conventionally, this kind of portable device is constructed in such a manner that a battery can be used as a power supply source. For this power supply source a primary battery which cannot be charged or a secondary battery which can be charged, can be used. Output voltage of the battery drops, in accordance with the remaining capacity of the battery. Accordingly, for applying a predetermined voltage to a circuit such as a motor, the device is constructed in such a manner that the output voltage of the battery is controlled by a switching regulator. On the other hand, when the battery is used for a circuit such as a microcomputer, which requires an extremely stable voltage, the output voltage of the battery may be controlled by a series regulator.

The switching regulator has a high efficiency when the input-output voltage difference of the switching regulator is large. However, since electric current is consumed by the circuitry of the switching regulator, when the voltage of the battery becomes low, electric power consumed by the device in which the switching regulator is mounted is increased. Thus, the switching regulator has a drawback in that the operating life of the battery is shortened and noise appears in the output voltage of the switching regulator. On the other hand, in the series regulator, although noise is completely removed from the output voltage thereof, there is a drawback in that the efficiency is low when the output voltage of the battery is high, since heat is radiated in accordance with the input-output voltage difference of the series regulator.

SUMMARY OF THE INVENTION

Therefore, an object of the present invention is to provide a power supply device in which electric power consumed in a battery is reduced, so that the life of the battery can be lengthened.

Another object of the present invention is to provide a power supply device in which electric power consumed in a battery is reduced so that the life of the battery can be lengthened, and which operates with a high efficiency to remove noise from the output voltage so that a stable voltage can be outputted.

According to the present invention, there is provided a power supply device for supplying electric power to a device to be operated. The power supply device includes a battery, a switching regulator for adjusting electric power inputted from the battery to a constant value, and a supply mechanism selectively supplying one of the output power of the battery and the adjusted power of the switching regulator, to the device to be operated.

The supply mechanism may supply power to the operated device through the switching regulator when the output electric power of the battery is higher than a predetermined value, and may supply power to the operated device without the switching regulator, when the output electric power of the battery is lower than the predetermined value.

The power supply device may further comprise a series regulator. The supply mechanism supplies power to the device to be operated through at least the switching regulator when the output power of the battery is higher than a predetermined value, and supplies power to the device to be operated through the series regulator, and without the switching regulator when the output power of the battery is lower than the predetermined value.

Further, according to the present invention, there is provided a power supply device for supplying voltage to a device to be operated. The power supply device includes, a battery, a sensing mechanism sensing the output voltage of the battery, a switching regulator, and a supply mechanism selectively supplying one of the output voltage of the battery and the adjusted voltage of the switching regulator to the device to be operated. The supply mechanism supplies the voltage to the device to be operated through the switching regulator when the output voltage of the battery is higher than a predetermined value, and supplies the voltage to the device to be operated without the switching regulator when the output voltage of the battery is lower than the predetermined value.

Furthermore, according to the present invention, there is provided a power supply device for supplying a voltage outputted by a battery to a device to be operated. The power supply device includes a switching regulator adjusting a voltage inputted therein from the battery to a constant value, and a control mechanism controlling a voltage supplied to the device to be operated. The control mechanism controls the voltage to the constant value which is obtained by the switching regulator when the output voltage of the battery is higher than a predetermined value, and controls the voltage in accordance with the output voltage of the battery, when the output voltage of the battery is lower than the predetermined value.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
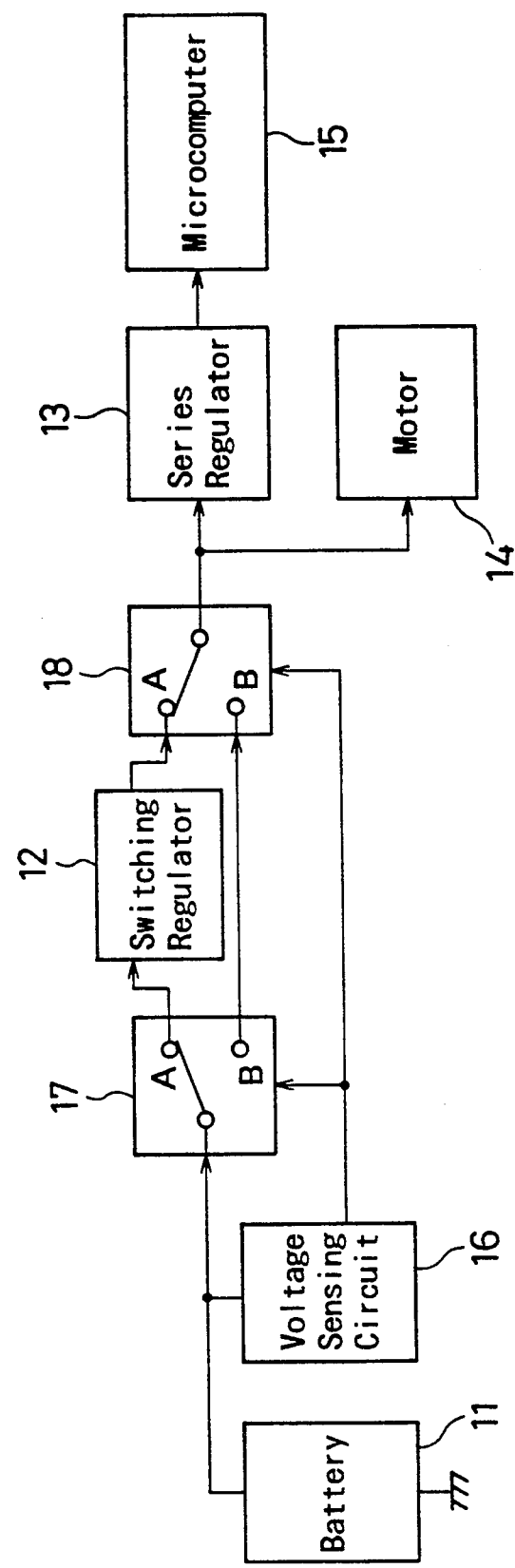
FIG. 1 is a block diagram showing a circuit of a power supply device to which an embodiment of the present invention is applied.

The present invention will now be described with reference to embodiments shown in the drawings.

FIG. 1 shows a general construction of a power supply device of an embodiment of the present invention.

An output voltage of a battery 11 is applied to a device to be operated, such as a motor 14 and a microcomputer 15, through or without a step-down type switching regulator 12 and a series regulator 13. Namely, the output voltage of the battery 11 is adjusted to a constant value by the switching regulator 12, or is not controlled by the switching regulator 12, with the output voltage applied to the motor 14. The output voltage of the battery 11 is adjusted to a constant value by the switching regulator 12, or is not controlled by the switching regulator 12, and then is controlled by the series regulator 13 to be applied to the microcomputer 15. The battery 11 may be a primary battery which cannot be charged, or a secondary battery which can be charged. Namely, a Ni-Cd battery, a lead storage battery, a lithium battery or a manganese battery, for example, can be used as the battery 11.

The output voltage of the battery 11 is sensed by a voltage sensing circuit 16, which is connected to a first switch 17 provided between the battery 11 and the switching regulator 12, and connected to a second switch 18 provided between the switching regulator 12 and the series regulator 13. The switches 17 and 18 are controlled by the voltage sensing circuit 16 in accordance with the output voltage of the battery 11. Namely, when the output voltage of the battery 11 is higher than a predetermined value, the first and second switches 17 and 18 are switched to first terminals A, respectively, so that the switching regulator 12 is connected to the battery 11 and the series regulator 13. Conversely, when the output voltage of the battery 11 is lower than a predetermined value, the first and second switches 17 and 18 are switched to second terminals B, respectively, so that the battery 11 is directly connected (i.e., without the switching regulator 12) to the series regulator 13.

The motor 14 is connected between the second switch 18 and the series regulator 13. Therefore, when the output voltage of the battery 11 is higher than a predetermined value, a voltage controlled by the switching regulator 12 is applied to the motor 14, since the first and second switches 17 and 18 are switched to the first terminals A. When the output voltage of the battery 11 is lower than a predetermined value, this output voltage is directly applied to the motor 14, since the first and second switches 17 and 18 are switched to the second terminals B. Note that, since a voltage necessary for operation of the motor 14 does not need to be stable, the voltage is not controlled by the series regulator 13.

The microcomputer 15 is connected to the series regulator 13. Therefore, when the output voltage of the battery 11 is higher than a predetermined value, a voltage controlled by the switching regulator 12 and the series regulator 13 is applied to the microcomputer 15, since the first and second switches 17 and 18 are switched to the first terminals A. When the output voltage of the battery 11 is lower than a predetermined value, a voltage controlled only by the series regulator 13 is applied to the microcomputer 15, since the first and second switches 17 and 18 are switched to the second terminals B. Thus, since the microcomputer 15 needs to have a highly stable voltage applied thereto, a voltage is always applied to the microcomputer 15 through the series regulator 13, so that noise contained in the voltage, outputted by the switching regulator 12, is reduced.

Figure 2:
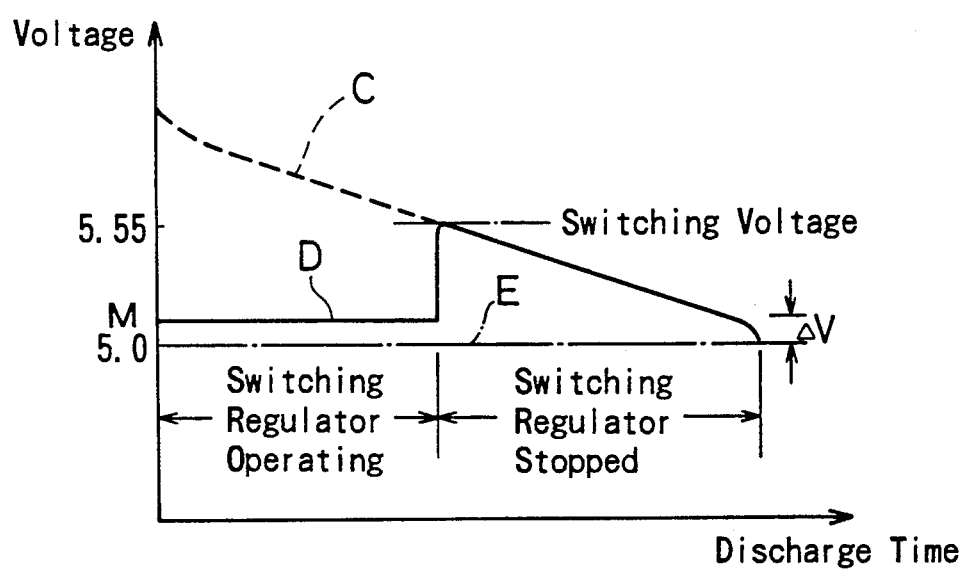
FIG. 2 is a diagram showing a relationship between discharge time and voltage.

FIG. 2 shows a relationship between discharge time of the battery 11 and voltage outputted to a device to be operated such as the motor 14 and the microcomputer 15.

As shown by a broken line C in FIG. 2, the voltage of the battery 11 decreases linearly over time. A voltage applied to the device to be operated, i.e., the voltage outputted from the second switch 18, changes as shown by the solid line D in the drawing, by controlling the switching regulator 12 in accordance with the amount of the voltage from the battery 11. Namely, when the battery voltage is higher than a predetermined switching voltage (5.55 (V) in FIG. 2), the switches 17 and 18 are switched to the terminals A. Thus, the battery voltage is controlled and adjusted to 5.0 (V), for example, by an operation of the switching regulator 12, and is outputted to the device to be operated. Conversely, when the battery voltage becomes lower than the switching voltage, the switches 17 and 18 are switched to the terminals B. Thus, the battery voltage is outputted to the device to be operated without (or not through) the switching regulator 12.

The operation of the switching regulator 12 is described in more detail below with reference to an example in which the motor 14 is the device to be operated.

Here, it is assumed that the operating voltage of the motor is 5 (V), the operating current is 1 (A), and the output voltage of the battery 11, immediately after a charge operation, is 7 (V). If the conversion efficiency of the switching regulator 12 is 90%, the electric power consumed from the battery 11 is $$5.0(V) \times 1.0(A) \div 0.9 \approx 5.55(W)$$

and electric current supplied from the battery to the switching regulator is $5.55/7 \approx 0.79$ (A). Conversely, when the series regulator is used to obtain 5 (V) at 1 (A), the power consumed from the battery 11 is 7 (W), since the current outputted from the battery 11 is 1 (A). Accordingly, when using the switching regulator 12, the consumption of of about 1.5 (W) of electric power is eliminated. Thus, when the voltage of 7 (V) is converted to 5 (V) and outputted to the motor 14 through the switching regulator 12, the consumed electric power (consumed electric current) is reduced, and thus the life of the battery 11 is extended.

When the battery voltage drops and becomes lower than 5.55 (V), the electric current supplied to the switching regulator 12 from the battery 11 exceeds 1 (A) which is supplied to the device to be operated. Therefore, the switches 17 and 18 are switched, so that the switching regulator 12 is stopped. Namely, the voltage applied to the motor 14 drops inearly from 5.55 (V) over time, as shown in FIG. 2.

On the other hand, when the microcomputer 15 is the device to be operated, the voltage applied to the microcomputer 15 is always controlled or adjusted to a constant value, for example 5.0 (V). Namely, the output voltage of the series regulator 13 is a constant value 5.0 (V) regardless of whether the switching regulator 12 is operated or not, as shown by a dotted line E. When the battery voltage is higher than the switching voltage, the output voltage M of the switching regulator 12 has a value higher than the constant value 5 (V) by the minimum input-output voltage difference $\Delta V$. Note that the minimum input-output voltage difference $\Delta V$ means the minimum value of the difference between an input voltage and an output voltage of the series regulator 13.

Figure 3:
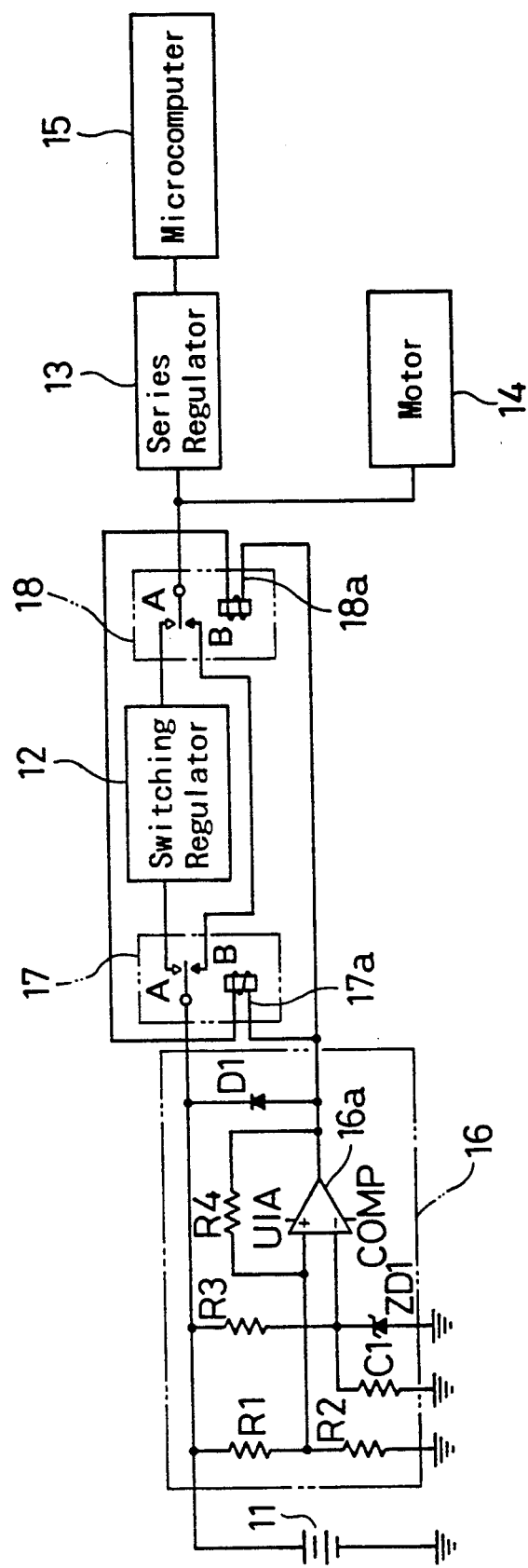
FIG. 3 is a block diagram showing the circuit of FIG. 1 in more detail.

FIG. 3 shows a circuit which indicates more concretely the circuit of FIG. 1. In the voltage sensing circuit 16, a voltage divided by resistances R1 and R2 is applied to a non-inverting input of an operational amplifier 16a, and a reference voltage generated by a Zener diode ZD1 is applied on an inverting input of the operational amplifier 16a. When the voltage applied on the non-inverting input exceeds the reference voltage, i.e., when the output voltage of the battery 11 is higher than 5.5 (V), for example, the operational amplifier 16a outputs an "H" (high) signal. Accordingly, electric current does not flow in relays 17a and 18a of the first and second switches 17 and 18. Therefore, the first and second switches 17 and 18 are switched to the terminals A, and thus the switching regulator 12 is operated. Conversely, when the voltage applied on the non-inverting input of the operational amplifier 16a is lower than or equal to the reference voltage, i.e., when the output voltage of the battery 11 is lower than or equal to 5.5 (V), for example, the operational amplifier 16a outputs a "L" (low) signal. As a result, an electric current flows in relays 17a and 18a of the first and second switches 17 and 18, and thus the first and second switches 17 and 18 are switched to the terminals B, so that the switching regulator 12 is stopped.

Note that a construction of the voltage sensing circuit 16, shown in FIG. 3 is merely an example. Instead of this construction, the voltage sensing circuit 16 may be constructed by a CMOS circuit in which only a small amount of electric current is consumed. Further, in the switches 17 and 18, a power MOSFET can be used instead of the relays 17a and 18a, since the switches 17 and 18 need to pass a substantial electric current.

Figure 4:
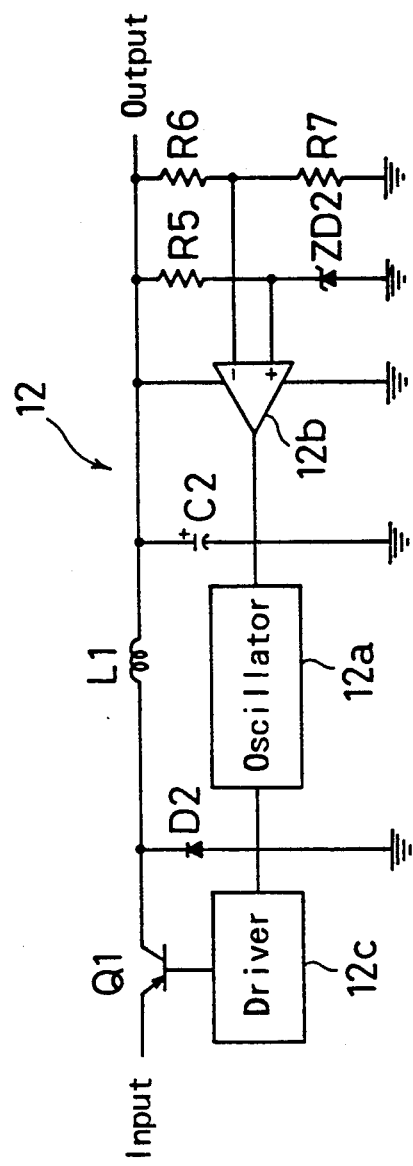
FIG. 4 is a circuit diagram of a switching regulator.

FIG. 4 shows a construction of the switching regulator 12. In this drawing, an oscillator 12a outputs a pulse signal having a predetermined duty ratio, in accordance with a reference signal outputted by an operational amplifier 12b. The operational amplifier 12b outputs the reference signal in accordance with a difference between a voltage divided by resistances R6, R7 and a reference signal generated by a Zener diode ZD2. A driver 12c turns a switch Q1 ON and OFF in accordance with a pulse signal outputted by the oscillator 12a. In accordance with a duty ratio of the ON-OFF operation of the switch Q1, voltages applied to the inputs of the operational amplifier 12b are varied. Thus, the amount of the reference signal outputted by the operational amplifier 12b is controlled. Accordingly, the switching regulator 12 outputs a constant voltage regardless of the amount of its input voltage.

Figure 5:
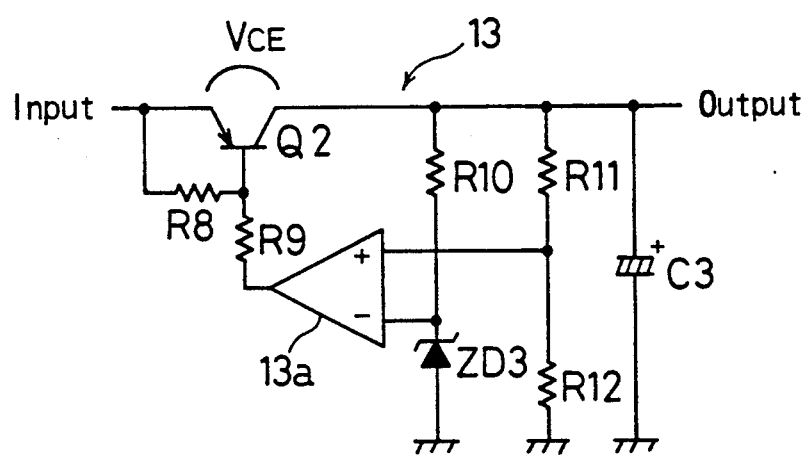
FIG. 5 is a circuit diagram of a series regulator.

FIG. 5 shows a construction of the series regulator 13. An output terminal of an operational amplifier 13a is connected to a base of a transistor Q2, which controls an electric current flowing to the device operated, in accordance with an output voltage of the operational amplifier 13a. This transistor Q2 is a pnp type, and is active even when the base voltage is lower than the emitter voltage. Namely, for example, even when the input voltage (i.e., the battery voltage) drops to 5.1 (V) and the base voltage becomes 4.5 (V), the transistor Q2 operates, so that the series regulator 13 can output a voltage of 5.0 (V). The operational amplifier 13a outputs a control signal in accordance with a difference between a voltage divided by resistances R11, R12 and a reference voltage generated by a Zener diode ZD3. The transister Q2 controls an electric current flowing to the operated device in accordance with the control signal, and thus the series regulator 13 outputs a constant voltage regardless of the amount of voltage. Note that the saturation voltage $V_{CE}$ of the transistor Q2 corresponds to the minimum input-output voltage difference $\Delta V$, as shown in FIG. 2.

As described in the above embodiment, when the battery voltage (or electric power of the battery) is higher than a predetermined value, electric power is supplied to the motor 14 through the switching regulator 12, and is supplied to the microcomputer 15 through the switching regulator 12 and the series regulator 13. When the battery voltage (or an electric power of the battery) is lower than a predetermined value, electric power is supplied directly to the motor 14 from the battery 11, and is supplied to the microcomputer 15 through the series regulator 13. Thus, only when the battery voltage is higher than a predetermined value, is the switching regulater 12 operated. Therefore, the electric power consumed from the battery 11 is reduced, and thus the life of the battery 11 is prolonged.

Further, in the embodiment, since the series regulator 13 is not used for the motor 14, the amount of heat generated by the series regulator 13 is kept low. Therefore, a heat sink and a power transistor of the series regulator 13 can be small, and thus the size of the power supply device can be miniaturized.

Still further, since the series regulator 13 is provided at the output side of the switching regulator 12, noise in the output voltage of the switching regulator 12 is reduced by the series regulator 13. Therefore, the output voltage of the power supply device becomes more stable, in comparison with a construction in which only the switching regulator 12 is provided.

Note, while the first and second switches 17 and 18 are switched in accordance with the amount of the battery voltage in the embodiment, the first and second switches 17 and 18 may be switched in accordance with the amount of the output current of the battery 11, when an electric current flowing in the device to be operated is taken into consideration.

Further, the switching regulator 12 is not restricted to a step-down type, but may be a step-up type.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 4-70138 (filed on Feb. 20, 1992) which is expressly incorporated herein by reference in its entirety.

I claim:

1. A power supply for supplying electric power to a device to be operated, said power supply comprising:
   a battery;
   a switching regulator for adjusting electric voltage inputted from said battery to a constant value; and
   means for selectively supplying one of an output electric power of said battery and an adjusted electric power of said switching regulator to said device to be operated, wherein said means for selectively supplying comprises; a voltage sensing circuit for sensing the output voltage of said battery, a first switch provided between said battery and said switching regulator, and a second switch provided between said switching regulator and said operated device, said first and second switches being switched in accordance with the output voltage sensed by said voltage sensing circuit.

2. A power supply according to claim 1, wherein said supplying means supplies power to said operated device through said switching regulator when the output electric power of said battery is higher than a predetermined value, and supplies power to said operated device without said switching regulator when the output electric power of said battery is lower than the predetermined value.

3. A power supply according to claim 1, further comprising a series regulator for controlling voltage inputted thereto by adjusting the voltage to a constant value, said supplying means supplying power to said device to be operated through at least said switching regulator when the output power of said battery is higher than a predetermined value, and supplying power to said device to be operated through said series regulator and without said switching regulator when the output power of said battery is lower than the predetermined value.

4. A power supply according to claim 1, wherein said battery is a primary battery which cannot be charged.

5. A power supply according to claim 1, wherein said battery is a secondary battery which can be charged.

6. A power supply according to claim 1, wherein said switching regulator is a step-down type switching regulator.

7. A power supply according to claim 1, wherein said switching regulator is a step-up type switching regulator.

8. A power supply according to claim 1, wherein said supply means selectively supplies one of the output electric power of said battery and the adjusted electric power of said switching regulator to said device to be operated, in accordance with an output voltage of said battery.

9. A power supply for supplying electric power to a device to be operated, said power supply comprising:
a battery;
means for sensing an output voltage of said battery and comparing the sensed voltage to a predetermined value;
a switching regulator for adjusting voltage inputted thereto, from said battery, to a constant value; and
means for selectively supplying one of the output voltage of said battery and the adjusted voltage of said switching regulator to said device to be operated, said supplying means supplying the voltage to said device to be operated through said switching regulator when the output voltage of said battery is higher than said predetermined value, and supplying the voltage to said device to be operated without said switching regulator when the output voltage of said battery is lower than said predetermined value.

10. A power supply for supplying electric power outputted by a battery to a device to be operated, said power supply comprising:
a switching regulator for adjusting voltage inputted thereto from said battery to a constant value;
means for sensing an output voltage of said battery and comparing said output voltage to a predetermined value; and
means for controlling voltage supplied to said operated device, said controlling means controlling the voltage to a constant value which is obtained by said switching regulator when said means for sensing and comparing determines the output voltage of said battery is higher than said predetermined value, and controlling the voltage in accordance with the output voltage of said battery when said means for sensing and comparing determines the output voltage of said battery is lower than said predetermined value.

11. A power supply according to claim 9, further comprising a series regulator for controlling voltage inputted thereto by adjusting the voltage to a constant value, said supplying means supplying power to a second device to be operated through at least said switching regulator when the output power of said battery is higher than a predetermined value, and supplying power to said second device to be operated through said series regulator and without said switching regulator when the output power of said battery is lower than the predetermined value, while supplying said device to be operated without said switching regulator or said series regulator when the output power of said battery is lower than the predetermined value.

12. A power supply according to claim 9, wherein said means for selectively supplying comprises; a voltage sensing circuit for sensing the output voltage of said battery, a first switch provided between said battery and said switching regulator, and a second switch provided between said switching regulator and said operated device, said first and second switches being switched in accordance with the output voltage sensed by said voltage sensing circuit.

13. A power supply for supplying electric power to a device to be operated, said power supply comprising:
a battery;
a switching regulator for adjusting electric voltage inputted from said battery to a constant value; and
means for selectively supplying one of an output electric power of said battery and an adjusted electric power of said switching regulator to said device to be operated, wherein said means for selectively supplying comprises; a current sensing circuit for sensing the output current of said battery, a first switch provided between said battery and said switching regulator, and a second switch provided between said switching regulator and said operated device, said first and second switches being switched in accordance with the output current sensed by said current sensing circuit.

14. A power supply according to claim 13, further comprising a series regulator for controlling voltage inputted thereto by adjusting the voltage to a constant value, said supplying means supplying power to said device to be operated through at least said switching regulator when the output current of said battery is higher than a predetermined value, and supplying power to said device to be operated through said series regulator and without said switching regulator when the output current of said battery is lower than the predetermined value.

* * * * *